3,383,191
DIAMOND ABRASIVE ARTICLE CONTAINING HEXAGONAL CRYSTALLINE BORON NITRIDE PARTICLES
James A. Thomas, Haddon Heights, N.J., assignor to Simonds Abrasive Company, Philadelphia, Pa., a corporation of Pennsylvania
No Drawing. Filed June 3, 1965, Ser. No. 461,192
12 Claims. (Cl. 51—298)

ABSTRACT OF THE DISCLOSURE

An abrasive article, particularly in the form of a grinding wheel, having an abrasive portion composed of diamond abrasive grain united together by a resinoid bond and containing non-abrasive boron nitride having a hexagonal crystal structure.

---

Although diamond, both natural and synthetic, has come into wide use as an abrasive because of its unique hardness, its high cost has prevented its use in many operations to which it is well suited. Because of its high cost it is of great important that diamond abrasive articles be formed in such manner that no undue loss of diamond occurs through excessive and unwanted breakdown of the bonding material. In other words, the bond should not release the diamond abrasive grain until the grain has been utilized to the fullest degree so that the abrasive article will have a relatively high grinding ratio or grinding efficiency as expressed by the formula:

$$\text{grinding ratio} = \frac{\text{volume of material ground}}{\text{volume of wheel worn}} \quad (I)$$

It has been suggested to make diamond wheels in which the bond, preferably a metallic bond, contains a small amount up to 5% by weight of bond, of boron nitride. The boron nitride is said to have the effect of producing a softer wheel grade without any appreciable sacrifice of wheel life. However, when boron nitride is present in these small amounts there is very little, if any, increase in grinding ratio or grinding efficiency over similar diamond wheels containing no boron nitride.

An object of the present invention is to provide an improved diamond abrasive article.

Another object of this invention is to provide a diamond abrasive article of greatly increased grinding efficiency.

A further object of this invention is to provide a diamond abrasive grinding wheel of improved performance characteristics.

These and other objects of this invention will be apparent from the following disclosure and appended claims.

According to this invention there is provided an abrasive article having an abrasive portion consisting essentially of diamond abrasive grain and a resinoid bond for the abrasive grain, the bond containing from about 15% to about 75% by weight of the bond, of finely divided boron nitride particles. Preferably, the bond contains from about 35% to about 65% of boron nitride.

It was discovered that when a substantial amount of boron nitride is incorporated in the resinoid bond of a diamond abrasive article a vast increase in grinding ratio or grinding efficiency, as expressed by Formula I, above, is obtained without any significant reduction in other desirable properties of the article. More particularly, at least a 65%, and as much as a six-fold, increase in grinding efficiency is obtainable according to this invention as compared with similar abrasive articles containing no or only a small amount, 5% or less by weight of bond, of boron nitride.

Just what function the boron nitride plays in obtaining these high grinding ratios is not entirely understood. Apparently under dry grinding conditions where no liquid coolant is employed to control grinding temperatures, the novel bond of this invention containing substantial amounts of boron nitride retains the diamond particles very tenaciously. At the same time, the boron nitride apparently aids in the grinding action under drying conditions whereby the grinding operation requires less power and is more efficient.

Although the advantages provided by this invention may be obtained with abrasive articles in which the entire article is abrasive, ordinarily it will be used in the abrasive portion of articles in which the entire body is not abrasive. For example, the invention may be utilized in grinding wheels having a non-abrasive core surrounded by an annular abrasive rim. Likewise the invention may be used to advantage in the abrasive portion of abrasive hones wherein the abrasive portion is attached to a support by cement or by molding the support and abrasive sections and maturing the two together.

It will be understood that this invention is directed to improvements in the abrasive portion of abrasive articles and that in composite articles such as grinding wheels having a non-abrasive core, the non-abrasive portion may be of those compositions and be prepared by those methods well known in the abrasives art. For example, the non-abrasive core or support may be formed of any bond suitable for use in the abrasive art, such as a thermoset resin or high melting point thermoplastic resin bond, or vitreous or metallic bond, providing the bond provides sufficient strength and other necessary physical properties.

As stated above, the abrasive portion of the abrasive articles of this invention comprise diamond abrasive grain and a resinoid bond for the grain, the bond containing a substantial amount of boron nitride. Generally the abrasive portion will contain about 5% to about 50% by weight of diamond grit and from about 50% to about 95% bond. Preferred proportions of grit and bond are about 15% to about 40% grit and about 85% to 60% bond.

The grit may comprise natural or synthetic diamonds or mixtures of these two types. The natural diamonds are produced by crushing bort, a product of mining operations carried on mainly in Africa. Typical natural diamond grit is known as "conventional" or SND–RB natural diamond" supplied by Diamond Abrasive Company, New York, or Englehard-Hanovia Corp., Newark, N.J. There are various manufacturers of synthetic diamond grit. Two particularly useful synthetic diamond grit types suitable for use in this invention are "Type RVG" and "Type MBG" described and illustrated in an article entitled "A Progress Report: Ten Years in the Diamond Industry," by E. Louis Kapernaros, published Mar. 5, 1965, by the General Electric Company, Detroit, Michigan. Another suitable synthetic diamond abrasive is "Type SYN" supplied by Englehard-Hanovia Corp.

Regardless of whether the diamond abrasive is natural or synthetic and regardless of the type within these general classes, the grit should have a particle size in the range between about 9 and 200 microns. A particularly useful diamond grit is one having particles in the range between 125 and 175 microns (commonly referred to in the art as 100 grit size).

The resin bond of this invention contains as essential constituents resin and boron nitride. In addition, the bond may contain those fillers usually employed in the abrasive art. The bond, for example, may comprise from about 25% to about 85% by weight of bond of resin and from about 75% to about 15% of boron nitride. Preferably, the bond will comprise from about 35% to about 65% of boron nitride for with boron nitride present in these amounts, highest grinding efficiencies ordinarily are obtainable as shown by the data set forth in Table I below. Where the bond contains less than 75% boron nitride, filler may be added in any amount up to an amount where the combined weight of boron nitride and filler is 75%.

The boron nitride powder used in this invention may have a particle size in the range of from about 1 to about 40 microns. The average particle size ordinarily will be about 10 microns. Boron nitride has the chemical formula BN and is available commercially as a white unctuous, non-abrasive powder analyzing 99.5% BN with the balance principally oxygen and carbon. It has an hexagonal crystal structure and sublimes at about 2700° C.

Both thermosetting and high melting point thermoplastic resins may be used in the resinoid bond of this invention. The thermoset resins may be any of those well known thermosetting resins heretofore used in resinoid bonds in the abrasives art. Usually such resins are two-step phenol-aldehyde resins which are converted to the infusible, insoluble state by heating (heat advancing). Other well known thermosetting resins also may be used. A preferred thermosetting resin is a polyvinyl butyral-modified, two-stage thermosetting phenolic resin having a softening point of 107–117° C., and a nitrogen content of 2.8–3.3% and a particle size such that 97.5% is −200 mesh (Resinox 795, Monsanto Chemical Company, Springfield, Mass.).

The high melting point (above about 300° C.) thermoplastic resins which may be used in the bond according to this invention are relatively new and are characterized by having rings in the polymer chain. In some cases these rings are aromatic carbocyclics (containing only carbon atoms). Preferably, the rings are heterocyclics, in which nitrogen, oxygen or sulfur are present in the ring, for polymers having heterocyclic rings generally exhibit increased heat stability.

Typical of those high melting point polymers having carbocyclic rings which may be used in this invention are the polyphenyls, poly-m-phenoxylenes, polyphenylene sulfides, polybenzyls, polyphenethyls, polyterephalamides, polysulfonyldibenzamides, polyhydrazides, polyoxamides, phenolphthalein polymers, hydroquinone polyesters, and polyhydroxybenzoic acid polymers.

Suitable preferred polymers having heterocyclic rings which may be used in this invention include polyimides, polybenzimidazoles, polybenzothiazoles, polyquinoxalines, polyphenylenetriazoles, polydithiazoles, polyoxadiazoles, polyamides, pyrolyzed polyacrylonitrile and polyvinyl isocyanate ladder polymers. These polymers are described in the Oct. 3, 1964, issue of Chemical Week at pages 71 to 76.

Particularly preferred polymers are made by the reaction of pyromellitic dianhydride with an aromatic diamine, e.g. 4,4′-diaminodiphenyl ether, to yield polyamic acid, which is dehydrated to yield polyimide. Polymers of this general type are disclosed in British patent specification No. 935,388 published Aug. 28, 1963.

Suitable fillers which may be used in conjunction with boron nitride and resin according to this invention are silicon carbide (5–100 microns), flint (5–100 microns), aluminum oxide (25–100 microns) and cast iron (5–45 microns).

In forming the abrasive portion of abrasive articles according to this invention, whether the abrasive portion comprises the entire article or only a part thereof, the constitutents are mixed together to form a raw mix, and the raw mix is molded to the desired shape under heat and pressure. For example, diamond abrasive grit, a powdered thermoset phenolaldehyde resin and boron nitride powder, and any filler if desired, may be thoroughly mixed and heated to temperatures on the order to 200–250° F. for 10 to 20 minutes to sinter the resin. The resulting sinter cake may then be finely ground, say to −40 mesh, and then molded to the desired shape under heat and pressure. This procedure insures a uniform distribution of boron nitride particles throughout the bond. Where the abrasive article also is to have a non-abrasive support portion, such as a non-abrasive core, the core may be placed in suitable mold and the finely ground sintered raw mix may be added to the annular space between the outer periphery of the core and the mold wall. Thereafter heat and pressure may be applied to form the composite article.

Molding temperatures and pressures will vary, depending upon the formulation of the raw mix, the type of resin used, the size of the article to be molded and other factors. Phenolaldehyde resins ordinarily require temperatures of 300° to 375° F. and pressures of from 1500 to 3000 p.s.i. during molding. Molding conditions required by the various resins are well known to those skilled in the art of making diamond abrasive articles, such as diamond abrasive wheels.

The following examples illustrate the advantages to be obtained according to this invention.

Example I

A grinding wheel 6″ x 3/16″ x 1¼″ having an annular abrasive rim ⅛″ thick composed of diamond abrasive grain united together by a thermoset resin bond and a non-abrasive central core was prepared as follows:

A raw abrasive mix having the following composition was thoroughly blended and heated at 200–250° F. for 10–20 minutes to sinter the resin component, and the resulting sinter cake, after cooling was crushed to a −40 mesh powder.

| Material | Weight percent (total mix) | Weight percent of bond |
|---|---|---|
| Diamonds [1] | 35.43 | |
| Bond | 64.57 | |
| Thermoset phenolic resin [2] | | 58.8 |
| Flint (5–100μ) | | 41.2 |
| Boron nitride (average particle size 10μ) | | 0 |

[1] Synthetic (Type SYN supplied by Englehard-Hanovia Corp., Newark, N.J.) 125–175 microns.
[2] Polyvinyl butyral-modified, two-step thermoset phenolic resin having a softening point of 107–117° C., and a nitrogen content of 2.8–3.3%, and a particle size such that 97.5% is −200 mesh (Resinox 795, Monsanto Chemical Company, St. Louis, Mo.).

A core comprising thermoset phenolic resin and reinforcing fiberglass filler was placed in a cold mold and the sintered and ground raw mix was distributed in the mold about the periphery of the core. The grinding wheel was formed by hot pressing the core and raw mix at a temperature of 325° F. and a pressure of 2000 p.s.i. for 30 minutes.

The wheel was tested for grinding ratio after dressing and a break-in run during which 0.010″ of tungsten carbide was removed from 48 ½″ x ½″ blocks arranged in a pattern of 12 rows of 4 blocks each at a rate of 0.0005″ per pass.

The test conditions using the carbide blocks described above were such as to provide a downfeed of 0.0005″ per pass, a crossfeed of 0.050″ and a 295″/min. traverse of the work pieces (table speed), for a total of 50 passes equivalent to a total downfeed of 0.025″.

Tungsten carbide wear was obtained by an average of six micrometer measurements before and after each test run. Wheel wear was determined by four micrometer measurements of the wheel diameter before and after each test run. In addition the wheel was weighed on an analytical balance prior to and subsequent to each test run in order to determine weight loss.

The volume loss of the tungsten carbide work pieces was 0.2519 in.³, and the volume loss of the grinding wheel was 0.0134 in.³, providing a grinding ratio (Formula I) of 18.8.

Example II

A grinding wheel having an annular abrasive portion of the following composition was prepared and tested for grinding efficiency in the manner described in Example I.

| Material | Weight percent (total mix) | Weight percent of bond |
|---|---|---|
| Diamonds [1] | 35.59 | |
| Bond | 64.41 | |
| Thermoset phenolic resin [2] | | 59.2 |
| Flint (5–100μ) | | 37.4 |
| Boron nitride (average particle size 10μ) | | 3.4 |

[1] See F.N. 1, Ex. I.
[2] See F.N. 2, Ex. I.

The volume loss of the tungsten carbide work pieces was 0.2597 in.³, and the volume loss of the grinding wheel was 0.0120 in.³, providing a grinding ratio of 21.6.

Example III

A grinding wheel having an annular abrasive portion of the following composition was prepared and tested for grinding efficiency in the manner described in Example I.

| Material | Weight percent (total mix) | Weight percent of bond |
|---|---|---|
| Diamonds [1] | 36.29 | |
| Bond | 63.71 | |
| Thermoset phenolic resin [2] | | 61.0 |
| Flint (5–100μ) | | 21.4 |
| Boron nitride (average particle size 10μ) | | 17.6 |

[1] See F.N. 1, Ex. I.
[2] See F.N. 2, Ex. I.

The volume loss of the tungsten carbide work pieces was 0.2687 in.³, and the volume loss of the grinding wheel was 0.0076 in.³, providing a grinding ratio of 35.4.

Example IV

A grinding wheel having an annular abrasive portion of the following composition was prepared and tested for grinding efficiency in the manner described in Example I.

| Material | Weight percent (total mix) | Weight percent of bond |
|---|---|---|
| Diamonds [1] | 37.19 | |
| Bond | 62.81 | |
| Thermoset phenolic resin [2] | | 63.4 |
| Flint (5–100μ) | | 0.0 |
| Boron nitride (average particle size 10μ) | | 36.6 |

[1] See F.N. 1, Ex. I.
[2] See F.N. 2, Ex. I.

The volume loss of the tungsten carbide work pieces was 0.2944 in.³, and the volume loss of the grinding wheel was 0.0045 in.³, providing a grinding ratio of 65.4.

Example V

A grinding wheel having an annular abrasive portion of the following composition was prepared and tested for grinding efficiency in the manner described in Example I.

| Material | Weight percent (total mix) | Weight percent of bond |
|---|---|---|
| Diamonds [1] | 35.48 | |
| Bond | 64.52 | |
| Thermoset phenolic resin [2] | | 49.1 |
| Flint (5–100μ) | | 0.0 |
| Boron nitride (average particle size 10μ) | | 50.9 |

[1] See F.N. 1, Ex. I.
[2] See F.N. 2, Ex. I.

The volume loss of the tungsten carbide work pieces was 0.2944 in.³, and the volume loss of the grinding wheel was 0.0022 in.³, providing a grinding ratio of 134.

Example VI

A grinding wheel having an annular abrasive portion of the following composition was prepared and tested for grinding efficiency in the manner described in Example I.

| Material | Weight percent (total mix) | Weight percent of bond |
|---|---|---|
| Diamonds [1] | 33.91 | |
| Bond | 66.09 | |
| Thermoset phenolic resin [2] | | 36.7 |
| Flint (5–100μ) | | 0.0 |
| Boron nitride (average particle size 10μ) | | 63.3 |

[1] See F.N. 1, Ex. I.
[2] See F.N. 2, Ex. I.

The volume loss of the tungsten carbide work pieces was 0.2969 in.³, and the volume loss of the grinding wheel was 0.0044 in.³, providing a grinding ratio of 67.5.

For the sake of comparison, the results of Examples I to VI above, are tabulated in Table I, below:

TABLE I

| Example | Boron Nitride Wt. percent of Bond | Grinding Ratio |
|---|---|---|
| I (control) | 0 | 18.8 |
| II (control) | 3.4 | 21.6 |
| III | 17.6 | 35.4 |
| IV | 36.6 | 65.4 |
| V | 50.9 | 134 |
| VI | 63.3 | 67.5 |

These data show that, according to this invention, there may be obtained diamond grinding wheels having at least a 65%, and even as much as a six-fold increase in grinding ratio or grinding efficiency as compared to prior known grinding wheels (see Exs. I and II) containing no or a small amount, up to 5 percent by weight of bond, of boron nitride. In addition, the grinding wheels of this invention have ample strength to be used in those grinding operations where diamond wheels heretofore have generally been used.

It will be understood by those skilled in the art that there are many changes and variations which may be made in the foregoing practice wtihout departing from the spirit of the invention. The description is therefore not to be interpreted as limiting the invention as set forth in the following claims.

What is claimed is:

1. An abrasive article having an abrasive portion consisting essentially of diamond abrasive grain and a resinoid bond for said abrasive grain selected from the group consisting of thermosetting resins and thermoplastic resins having a melting point above about 300° C., said bond containing from about 15% to about 75% by weight of bond, of finely divided boron nitride particles having a hexagonal crystal structure.

2. An abrasive article according to claim 1 in which said abrasive portion contains from about 5% to about 50% by weight of diamond abrasive grain and from about 95% to about 50% of bond.

3. An abrasive article according to claim 2 in which said abrasive portion contains from about 15% to about 40% by weight of diamond abrasive grain and from about 60% to about 85% of bond.

4. An abrasive article according to claim 1 in which said bond contains from about 35% to about 65% by weight of bond of boron nitride.

5. An abrasive article according to claim 1 in which said resinoid bond comprises a thermosetting phenol-aldehyde resin.

6. An abrasive article according to claim 1 in which said resinoid bond comprises a polyvinyl butyral-modified, two-stage phenolic thermosetting resin having a softening point of about 107–117° C.

7. A grinding wheel having an abrasive portion consisting essentially of diamond abrasive grain and a resinoid bond for said abrasive grain selected from the group consisting of thermosetting resins and thermoplastic resins having a melting point above about 300° C., said bond containing from about 15% to about 75% by weight of bond, of finely divided boron nitride particles having a hexagonal crystal structure.

8. A grinding wheel according to claim 6 in which said abrasive portion contains from about 5% to about 50% by weight of diamond abrasive grain and from about 95% to about 50% of bond.

9. A grinding wheel according to claim 7 in which said abrasive portion contains from about 15% to about 40% by weight of diamond abrasive grain and from about 60% to about 85% of bond.

10. A grinding wheel according to claim 6 in which said bond contains from about 35% to about 65% by weight of bond of boron nitride.

11. A grinding wheel according to claim 7 in which said resinoid bond comprises a thermosetting phenol-aldehyde resin.

12. A grinding wheel according to claim 7 in which said resinoid bond comprises a polyvinyl butyral-modified, two-stage phenolic thermosetting resin having a softening point of about 107–117° C.

References Cited

UNITED STATES PATENTS

| | | | |
|---|---|---|---|
| 2,947,617 | 8/1960 | Wentorf | 51—307 |
| 3,087,803 | 4/1963 | Bakian | 51—298 |
| 3,136,615 | 6/1964 | Bovenkerk et al. | 51—307 |

ALEXANDER H. BRODMERKEL, *Primary Examiner.*

DONALD J. ARNOLD, *Examiner.*